United States Patent [19]

Botts

[11] Patent Number: 5,002,657
[45] Date of Patent: Mar. 26, 1991

[54] SEPARATOR FOR OIL WELL PRODUCTION FLUIDS

[76] Inventor: John B. Botts, 2901 Western Ave., Mattoon, Ill. 61936

[21] Appl. No.: 519,020

[22] Filed: May 4, 1990

[51] Int. Cl.⁵ .............................................. B01D 35/00
[52] U.S. Cl. .................................... 210/115; 137/140; 166/267; 210/537; 210/539; 210/540
[58] Field of Search ............... 210/537, 513, 540, 110, 210/109, 115, 123, 307, 539, 924, 538, 800, 95; 55/79; 166/185, 267, 167, 266, 75.1; 137/140

[56] References Cited

U.S. PATENT DOCUMENTS

| | | | |
|---|---|---|---|
| 249,868 | 11/1881 | Andrew | 210/538 |
| 365,259 | 6/1887 | Ide | 210/540 |
| 654,965 | 7/1900 | Franke | 137/140 |
| 2,348,167 | 5/1944 | Erwin | 210/538 |
| 3,800,950 | 4/1974 | Hess et al. | 210/924 |
| 4,252,649 | 2/1981 | Vret, Jr. | 210/170 |

Primary Examiner—Robert A. Dawson
Assistant Examiner—Ana Fortuna
Attorney, Agent, or Firm—Fleity, Jacobson, Cohn, Price, Holman & Stern

[57] ABSTRACT

A separator for oil well production fluids including oil, water and gases in which the separator includes a water siphon system having a vertically adjustable spill point for the discharge of water to a collection or disposal area for changing the interface level between the water in the bottom of the separator tank and the oil on top of the water in the separator tank. The separator is primarily constructed of a non-corrosive, non-conductive, high impact plastic with the siphon system and standpipe being positioned internally of the separator tank to reduce damage caused by high winds damaging such components by blowing down the separator which may have been weakened by corrosion with this arrangement also reducing the possibility of water in the siphon and standpipe being frozen which can occur when these components are oriented externally of the tank. The siphon system located internally of the tank is provided with a vertically adjustable spill point with this adjustment being made from exteriorly of the separator tank.

9 Claims, 1 Drawing Sheet

SEPARATOR FOR OIL WELL PRODUCTION FLUIDS

BACKGROUND OF THE INVENTION

1. Field of the Invention

The present invention relates to a gravity flow separator for oil well production fluids and more specifically to a separator for oil well production fluids including oil, water and gases in which the separator includes a water siphon system having a vertically adjustable spill point for the discharge of water to a collection or disposal area for changing the interface level between the water in the bottom of the separator tank and the oil on top of the water in the separator tank. The separator is primarily constructed of a non-corrosive, non-conductive, high impact plastic with the siphon system and standpipe being positioned internally of the separator tank to reduce damage caused by high winds damaging such components by blowing down the separator which may have been weakened by corrosion with this arrangement also reducing the possibility of water in the siphon and standpipe being frozen which can occur when these components are oriented externally of the tank. The siphon system located internally of the tank is provided with a vertically adjustable spill point with this adjustment being made from exteriorly of the separator tank.

2. Information Disclosure Statement

Gravity oil and water separators have been used extensively in separating oil well production fluids. Separators of this type, frequently called gun barrels, are especially useful in low to moderate production rate oil wells in which low to moderate volumes of water are produced with the oil and where the produced oils are of moderate to high specific gravity. Known gravity oil and water separators are relatively simple in concept and are reliable and do not require an energy source other than the energy supplied by the pumping wells to move the fluids through the flow lines through the separators. In separators of this type, when low volumes of gases are produced with the liquids, the gases are vented at the top of the separator to the atmosphere. If large volumes of gases are produced, a gas and fluid separator is interconnected between the flow lines and the fluid gravity separator to remove the excess gases. As the oil and water separate in the separator tank, water migrates to the bottom of the tank and oil toward the top with the water being discharged from the bottom area of the tank to a disposal site and the oil is discharged from the upper portion of the tank to a stock tank from which it is periodically removed for further processing. The separation capability of a gravity oil and water separator is a function of volume, time, fluid conditions and temperature with the volume, time and temperature conditions being variable depending upon the fluid conditions. The following U.S. patents relate to this field of endeavor and include various separator structures for separating oil and water in a separator tank.

249,868
365,259
654,965
2,348,167
4,252,649

While the above listed patents disclose separators, they do not include the specific structure of the internally positioned siphon system having a vertically adjustable spill point adjustable from externally of the separator tank. The above listed patents also fail to disclose the specific structural features of the other components of the separator.

SUMMARY OF THE INVENTION

An object of the present invention is to provide a separator for oil well production fluids including a separator tank having internally positioned flow line components including a siphon for discharge of water from the lower portion of the separator tank with the siphon including a vertically adjustable spill point which is adjustable externally of the tank in order to vary the interface level between water collecting in the bottom of the separator tank and oil collecting in the top of the separator tank.

Another object of the invention is to provide a separator in which the flow line components including the siphon system and flume are positioned internally of the separator tank with these components being constructed of a non-corrosive and non-conductive high impact plastic material to reduce damage from corrosion and damage from lightning with the flow line components being positioned internally of the tank also reducing weather damage such as occurs as the result of high winds during a windstorm causing damage to external siphons and standpipes especially if they have been weakened by corrosive which results in a blowdown of the siphon which automatically drains the separator tank. This also reduces freeze-up of the flow line components including the siphon system.

A still further object of the invention is to provide a structure for monitoring the presence of emulsions in the separator fluid at or near the fluid interface by utilizing an externally adjustable internal tap to allow tapping of samples at or near the interface level between the oil and water together with a sound emitter to simplify the detection of the interface between the oil and water.

Still another object of the invention is to provide a separator in accordance with the preceding objects constructed of superior materials, includes an externally adjustable internal siphon system, an externally adjustable internal sample tap, an ultrasound interface and emulsion detector, an arrangement of flow line components with the siphon system and standpipe located internally of the separator tank, a structura that is much less prone to environmental spills, less lightning prone, easily repairable, easily movable and easily insulated.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
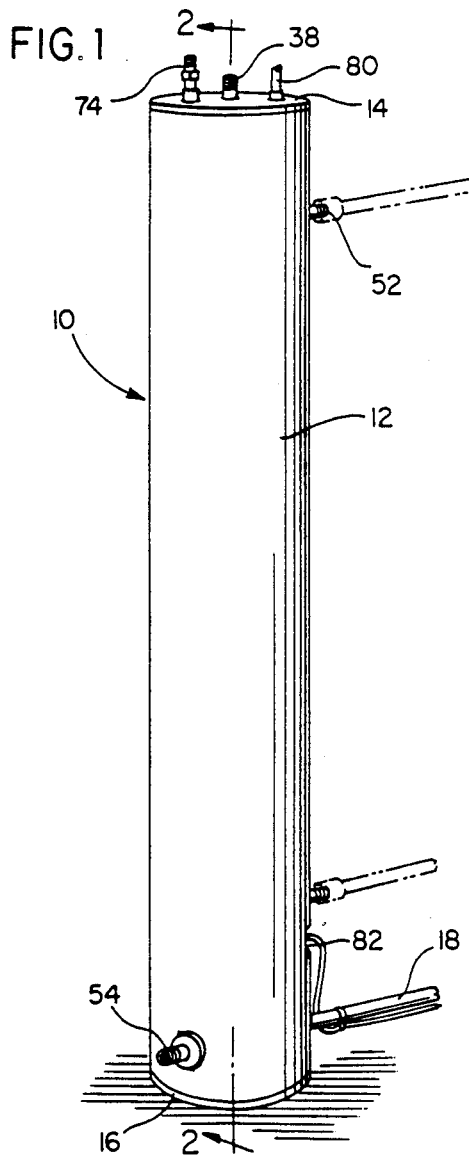
FIG. 1 is a perspective view of the separator of the present invention.

Referring now specifically to the drawings, the oil well production fluid separator of the present invention is generally designated by reference numeral 10 and includes a separator vessel or tank 12 of vertically elongated, cylindrical construction supported vertically in any suitable manner with the upper and lower ends of the tank 12 being closed by an upper end wall 14 and a bottom end wall 16. The manner in which the separator is supported will vary depending upon installational conditions. Extending radially into the lower end portion of the tank 12 is a pipe 18 from the producing oil well which conveys the production fluid including oil, water and gas into the interior of the separator tank 12 with the pipe 18 being connected to the lower end of a standpipe 20 located centrally of the separator tank 12 with the lower end of the standpipe being connected to the pipe 18 by a T-connection or any other suitable connection 22 with a short pipe section 24 extending downwardly from the connection 22 to support these components from the bottom end wall 16.

Positioned concentrically around the standpipe 20 is a vertically disposed flume 26 in the form of a vertical pipe which is concentrically spaced from and encloses the standpipe 20. The upper end portion of the standpipe 20 is closed at 28 and provided with a plurality of holes 30 below the upper end thereof for discharge of production fluid outwardly through the openings 30 into the interior of the flume 26. The upper end of the flume 26 is secured to the upper end wall 14 by a flange 36 secured to the end wall 14 and telescoped over the upper end of the flume 26. Also, a vent 38 extends through the upper end wall 14 and communicates with the upper end of the flume to vent gases from the upper end of the flume 26 to the atmosphere or to some other disposal site. The liquid portion of the production fluid discharges from the openings 30 and flows downwardly between the flume 26 and the standpipe 20. The flume includes an inwardly offset portion 40 to reduce the cross-sectional configuration thereof and supporting centralizers or spiders 42 are provided to retain the standpipe 20 centrally disposed in the flume 26 and yet permit flow of fluids therethrough thereby enabling gas to be vented through the vent 38 and liquid such as oil and water to pass downwardly to the lower end of the flume 26. The lower end of the flume 26 is supported by a flange 44 attached to the bottom end 16 of the separator tank 12 and telescoped over and rigidly fixed to the lower end of the flume at 46. The lower end of the flume is provided with a closure member 48 just above the T-connection 22 to confine the material in the flume. Other structural arrangements may be provided to rigidly support the flume and standpipe centrally within the separator tank 12 with the flume including a plurality of openings 50 adjacent the lower end thereof for discharging liquid oil and water components of the production fluid into a separation chamber 51 in the interior of the separator tank 12 in the space between the exterior of the flume 26 and the interior surface of the separator tank 12 so oil and water will flow into the interior of the separator.

Adjacent the upper end of the separator tank 12, an oil discharge pipe 52 is connected with the separator and communicated with the interior thereof to form a spill point with oil being discharged through the oil discharge pipe to a stock tank when oil rises to the spill point formed by the pipe 52.

Figure 2:
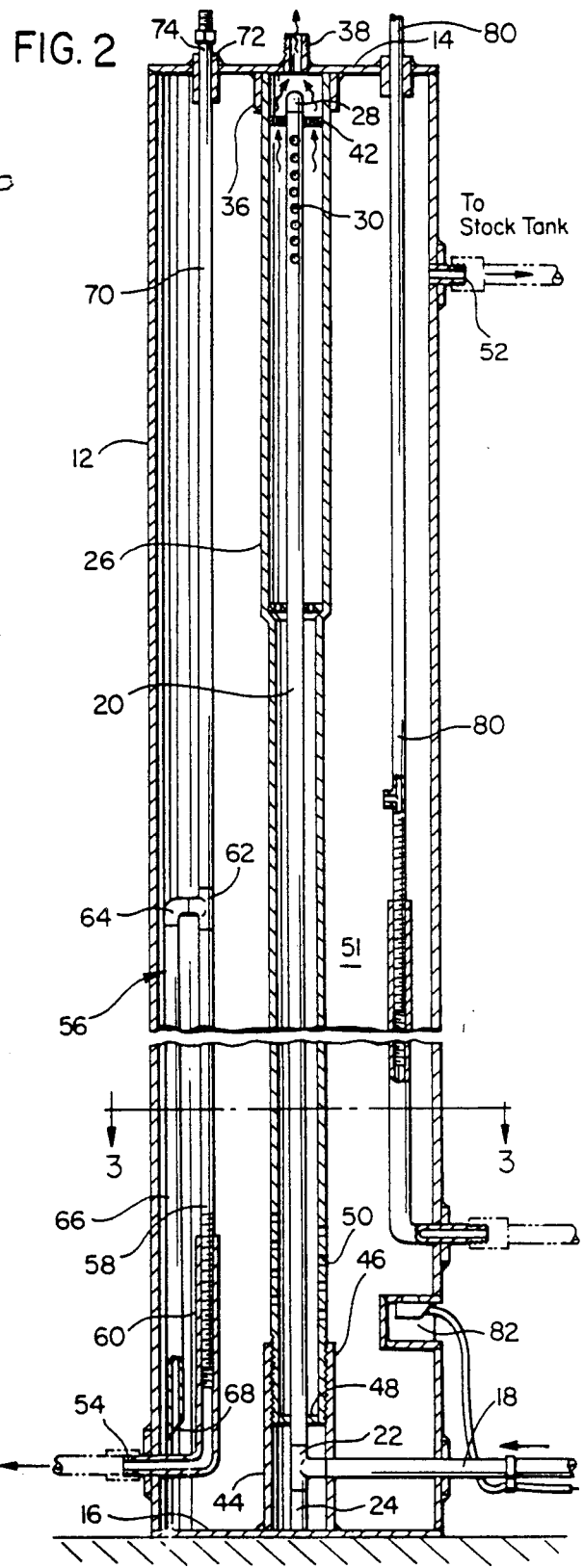
FIG. 2 is a vertical, sectional view, on an enlarged scale, taken substantially along section line 2—2 on FIG. 1 illustrating the structure of the separator and the relationship of the components.
Figure 3:
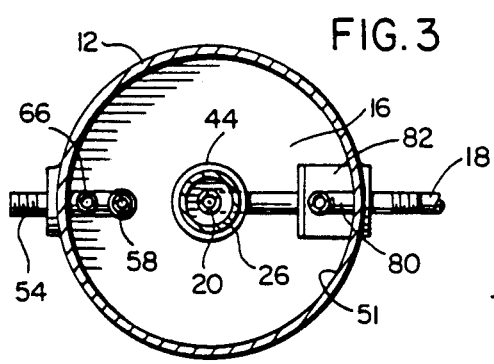
FIG. 3 is a transverse, sectional view taken substantially upon a plane passing along section line 3—3 on FIG. 2 illustrating further structural arrangements of the separator.

Adjacent the bottom of the separator tank 12, a water discharge pipe 54 is provided and extends through the wall of the separator and connected to a siphon system generally designated by the numeral 56. The water discharge pipe 54 extends to a disposal site or apparatus. The siphon system includes a siphon tube 58 vertically oriented in the separator tank 12 with the lower end of the siphon tube 58 being screw threadedly engaged with the water discharge pipe 54 as indicated by reference numeral 60 which enables vertical adjustment of the siphon tube which has a T-connection 62 incorporated therein located substantially above the vertical adjustment point 60 with the T-connection including an elbow 64 connecting the T-connection 62 to a siphon inlet tube 66 which extends downwardly and terminates in a water inlet 68 adjacent to but spaced above the bottom end wall 16 of the separator tank 12 as illustrated in FIG. 2. The T-connection 62 and the elbow 64 forms a spill point for the siphon system and this spill point can be adjusted by adjusting the screw threaded connection 60 between the siphon tube 58 and the L-shaped water discharge pipe 54. The T-connection 62 includes a vent tube 70 extending upwardly therefrom and externally through a sleeve 72 in the upper end wall 14 to provide a vent 74 for the siphon system and enabling rotational and vertical movement of all of the components of the siphon system in relation to the separator tank 12 and the water discharge pipe 54 thereby vertically adjusting the spill point of the siphon system from a position externally of the separator by providing a suitable adapter connected to the upper end of the vent tube 70 to rotate the vent tube 70, the T-fitting 62, the siphon tube 58 and the inlet tube 66 thereby vertically adjusting the water inlet 68 for the siphon system thereby varying the interface level between the water adjacent the bottom of the separator and the oil above the water in the separator.

With this arrangement, production fluid from the well enters the separator 10 through the pipe 18 into the standpipe 20 with the gas, if present, oil and water passing upwardly in the standpipe 20 and discharged through the openings 30 into the interior of the flume 26. Any gas present will be vented through the vent 38 and the oil and water components of the production fluid also is discharged from the openings 30 and passes downwardly between the standpipe 20 and flume 26 for discharge through the openings 50 into a separator chamber 51 between the interior of the separator tank 12 and the exterior of the flume 26 for gravity separation with water at the bottom of the separator chamber 51 and oil above the water. The oil is discharged through the pipe 52 into a stock tank and water is discharged from the bottom through the water discharge pipe 54 under the control of the adjustable siphon system 56 by varying the height of the spill point and the height of the water inlet 68.

The separator 10 is constructed from a non-corrosive, non-conductive, non-stick, chemically inert, lightweight, high impact, UV stabilized plastic material. By using fittings with surface-to-surface sealing, the need for welders and torches is eliminated. Where bolt-type fasteners are used, special plated bolts will be utilized to allow quick disassembly for repair or replacement. The use of the centralizers or spiders and the telescopic arrangement of the flume suspended from the top provides for expansion and contraction and the holes or openings in the lower end of the flume provide for easy flow of liquid into the separator chamber. Also, the separator tank may be provided with access doors if desired along with a drain valve for emptying the device for repair, movement or replacement.

Previous separators have been constructed of steel which have been subjected to corrosion since the production fluid from oil wells frequently include various corrosive liquids and gases such as carbolic acid, hydrogen sulfide, iron sulfide and the like. If the tank corrodes sufficiently to form a hole, the net result is a drain-down of the separator and the costly and dangerous and sometimes impossible job of effectively repairing the corroded area or possibly replacing the entire tank. The specific high impact plastic from which the components are constructed in this separator are substantially immune to all known corrosives encountered in oil well production fluids.

Another problem which exists with presently used separators is weather damage to externally mounted siphon systems and standpipes which are prone to being blown down in windstorms, especially if they have been weakened by corrosion. A blow-down of the siphon system automatically drains the separator, thus creating some of the same problems as repairing corrosion as well as environmental concerns. Also, exposed siphons and standpipes are prone to freeze-ups which requires the time and expense of insulating them which in turn creates another problem of slow thaw-out. With the present invention employing the externally adjustable internal siphon and the internal standpipe, the integrity of the separator will be maintained during various weather conditions and the freeze-up potential is substantially reduced.

So-called gun barrel separators are usually the tallest vessels in a tank battery and, since they are normally constructed of conductive materials, they are prone to lightening strikes which is not an unusual occurrence. By constructing the components and the vessel from non-conductive materials that are grounded to draw off electrostatic charges, the separator becomes much less prone to lightening strike and damage.

Due to the bulk and total weight of existing separators, they are relatively difficult to transport and set in place. Also, when it is desired to drain a separator and move it from an abandoned tank battery to another location to put it back in service, special moving equipment is required and the repair of the vessel and the flow lines can be both costly and complicated as well as dangerous. By constructing the tank and components of plastic material, a relatively low empty weight is obtained with the structure being sturdy, rugged and impact resistant. This enables the drain-down and moving to be easily accomplished by a small number of personnel using conventional equipment. The tank and other components can be stocked in oil field supply stores or warehouses to make the separator and its components more available without undue delay. Also, the tank and its components can be completely disassembled and any malfunctioning parts replaced and quickly put back into service by untrained personnel using readily available tools and supplies. The separator can be easily placed in the space formed between stock tanks and the standard walkway between stock tanks to provide easy access to the externally adjustable internal siphon system and valving for switching stock tanks.

Separators are subject to emulsions occurring or collecting which can result in carryover of water into the oil which flows into the stock tanks. Various types of emulsions exist including water in oil, oil in water, solids in water, solids in oil, chemical well-treating solutions that accelerate or stabilize emulsions and the like. Elaborate and expensive demulsifying vessels are used to control emulsions or specific chemicals and heat can be used to control emulsions. Thus, it is desirable to monitor the presence or absence of emulsions in the separator at or near the fluid interface. The present invention provides an externally adjustable internal tap 80 to allow tapping of samples at or near the interface of the oil and water. In addition to the adjustable tap, the present invention includes an ultrasound emitter 82 located in the lower part of the separator designed and placed to emit ultrasound vertically upwardly. Thus, where emulsions are a serious and costly problem, a portable ultrasound detector and recorder will simplify the detection of the interface to broadly indicate an emulsion problem or the absence of emulsions at or adjacent the interface. Also, inasmuch as the internal arrangement of the standpipe and siphon system provides a smooth, external surface to the tank that is free of protruding devices, a solar blanket can be used which will stabilize and help to maintain separation temperatures. Where low temperatures are encountered, an electrically heated insulating blanket could be used around the tank thereby eliminating the conventional use of expensive gas fired heater treaters thus maintaining separation temperatures in an economical and efficient as well as safe manner. An injection tap can be provided for injection of demulsifiers. Thus, with the ability to rapidly and effectively monitor for emulsions and the ability to inject demulsifiers, the effectiveness and volumes of fluid to be handled by the separator can be readily ascertained.

The construction of the separator is relatively simple, economical and reliable. The siphon system is openly connected to the lower part of the separator where the heavier salt or mineral waters accumulate due to gravity fall from the less dense oils above. The oils accumulate in the upper part of the separator and as the accumulation fills the separator, the spill point for the oil is reached thus allowing the oil to flow to the stock tanks. The oil spill point is fixed and not adjustable on the separator. As water accumulates in the lower part of the separator, the water rises in the siphon tube which is openly connected to the lower part of the separator and also openly vented at the top to the atmosphere. Located at a vertical point in the siphon tube is a connection which interconnects the siphon tube, vent tube and spill tube which provides an adjustable spill point for discharge of the exiting water. When water only enters the separator, water is the only fluid leaving the separator with the discharge being only at the water spill point. Conversely, when only oil enters the separator, only oil exits the separator and only at the oil spill point. When a combination of fluids enter the separator, after separation each fluid will exit the separator at their respective spill points.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A separator for oil well production fluids containing oil, water and gases comprising a generally vertically disposed vessel enclosing a separation chamber, an oil well production fluid inlet pipe extending into said vessel adjacent the lower end thereof, a vertically disposed standpipe in said vessel in communication with the inlet pipe, a flume in the form of a pipe enclosing and concentrically spaced from said standpipe, means at the upper end of the standpipe for discharging production fluid into the flume, vent means at the upper end of the flume for discharging gases in the production fluid, means at the lower end of the flume to discharge oil and water into the separation chamber, a siphon system internally of the vessel including a water outlet extending outwardly of the vessel at the lower end thereof and a water inlet internally of the vessel adjacent the bottom thereof with the siphon system including a spill point, means vertically adjustably supporting the spill point to vary the interface level between oil and water in the separation chamber, and an oil discharge pipe communicating with the separation chamber adjacent the upper end of the vessel.

2. The structure as defined in claim 1 wherein said means adjusting the spill point in the siphon system includes a vent tube for the siphon system extending upwardly to a point above the vessel and a screw threaded connection in the siphon system interconnecting the spill point and water discharge pipe to adjust the spill point in relation to the water discharge pipe and vessel.

3. The structure as defined in claim 2 wherein said adjustable siphon system spill point interconnects a tube leading from the inlet to the spill point with the spill point being connected to the water discharge pipe through a siphon tube with the siphon tube being screw threadedly connected to the water discharge pipe for vertically adjusting the spill point by rotating the vent tube extending above the vessel.

4. The structure as defined in claim 3 wherein said means at the upper end of the standpipe includes a plurality of holes longitudinally spaced in the upper end of the standpipe to discharge production fluid into the flume.

5. The structure as defined in claim 4 wherein the means for discharging oil and water adjacent the bottom of the flume includes a plurality of vertically spaced holes in the flume.

6. The structure as defined in claim 1 together with an adjustable sampling means, said sampling means being a sample tap, in said vessel to sample emulsions formed in the vessel to monitor the emulsion conditions within the vessel.

7. The structure as defined in claim 6 wherein said sampling tap is vertically adjustable from a point above the vessel.

8. The structure as defined in claim 1 wherein said separator is constructed of non-corrosive, non-conductive, impact resistant plastic material to reduce corrosion, weather damage and lightening damage.

9. The structure as defined in claim 1 wherein said vessel is an elongated, cylindrical member having closed ends with the upper end including means adjustably receiving the vent tube and a vent for the flume.

* * * * *